United States Patent
Cho et al.

(10) Patent No.: US 8,422,454 B2
(45) Date of Patent: Apr. 16, 2013

(54) METHOD OF TRANSMITTING AND RECEIVING UPLINK DATA USING TRANSMISSION OF PROFILE INDEXES

(75) Inventors: Hee Jeong Cho, Anyang-Si (KR); Ki Seon Ryu, Sungnam-Si (KR)

(73) Assignee: LG Electronics Inc., Seoul (KR)

( * ) Notice: Subject to any disclaimer, the term of this patent is extended or adjusted under 35 U.S.C. 154(b) by 279 days.

(21) Appl. No.: 12/988,715

(22) PCT Filed: May 20, 2009

(86) PCT No.: PCT/KR2009/002663
§ 371 (c)(1),
(2), (4) Date: Oct. 20, 2010

(87) PCT Pub. No.: WO2009/145521
PCT Pub. Date: Dec. 3, 2009

(65) Prior Publication Data
US 2011/0051694 A1    Mar. 3, 2011

Related U.S. Application Data

(60) Provisional application No. 61/056,019, filed on May 26, 2008.

(30) Foreign Application Priority Data

Jul. 1, 2008    (KR) .......................... 10-2008-0063548

(51) Int. Cl.
*H04W 4/00*    (2009.01)
(52) U.S. Cl.
USPC .......................................................... 370/330

(58) Field of Classification Search .................. None
See application file for complete search history.

(56) References Cited

U.S. PATENT DOCUMENTS

| | | |
|---|---|---|
| 2002/0093930 A1 | 7/2002 | Dertz et al. |
| 2003/0103520 A1 | 6/2003 | Chen et al. |
| 2005/0041573 A1 | 2/2005 | Eom et al. |
| 2005/0265227 A1 | 12/2005 | Byun et al. |

(Continued)

FOREIGN PATENT DOCUMENTS

| | | |
|---|---|---|
| KR | 10-0606101 B1 | 7/2006 |
| KR | 10-2006-0100202 A | 9/2006 |
| WO | WO 2006/004355 A1 | 1/2006 |

OTHER PUBLICATIONS

Cho et al. "CINR Reports for OFDMA PHY", IEEE P802.16e, 2005, 14 pages.

(Continued)

*Primary Examiner* — Raj Jain
(74) *Attorney, Agent, or Firm* — Birch, Stewart, Kolasch & Birch, LLP

(57) ABSTRACT

A device and method for exchanging a signal via a channel quality indicator channel (CQICH) between a base station and mobile station. The method includes: configuring periodic transmission times for the CQICH; receiving, from the mobile station, information indicating a time set, the time set including a subset of the periodic transmission times; and receiving an index among plural indexes via the CQICH. If the index is received at a time within the time set, the index is interpreted as being band width request information. If the index is received at a time not within the time set, the index is interpreted as being channel quality information.

9 Claims, 5 Drawing Sheets

U.S. PATENT DOCUMENTS

| | | |
|---|---|---|
| 2006/0072514 A1 | 4/2006 | Kent et al. |
| 2006/0077929 A1 | 4/2006 | Park |
| 2006/0154671 A1* | 7/2006 | Kang et al. .................... 455/450 |
| 2006/0239241 A1 | 10/2006 | Eom et al. |
| 2007/0104177 A1 | 5/2007 | Hwang et al. |
| 2007/0195764 A1 | 8/2007 | Liu et al. |
| 2007/0206561 A1 | 9/2007 | Son et al. |
| 2007/0264936 A1 | 11/2007 | Kim et al. |
| 2007/0274265 A1 | 11/2007 | Yoon et al. |
| 2008/0232240 A1* | 9/2008 | Baum et al. .................... 370/210 |
| 2008/0280619 A1 | 11/2008 | Chun et al. |
| 2009/0040970 A1 | 2/2009 | Ahmadi et al. |
| 2009/0041110 A1 | 2/2009 | Malladi |
| 2009/0258647 A1 | 10/2009 | Yamada et al. |
| 2010/0134324 A1 | 6/2010 | Kim et al. |
| 2011/0075628 A1 | 3/2011 | Cho et al. |
| 2011/0205997 A1 | 8/2011 | Chun et al. |

OTHER PUBLICATIONS

Lee et al. "Fast Dedicated Retransmission Scheme for Reliable Multicast Services in OFDMA Systems", Vehicular Technology Conference, 2005, pp. 1108-1112, ISBN: 0-7803-9152-7.

* cited by examiner

Fig. 5
| Codeword |
|---|
| 0000 |
| 0001 |
| 0010 |
| ... |
| 1101 |
| 1110 |
| 1111 |
Codewords 0000–1101: Cordwords for CQI
Codewords 1110–1111: Profile Indexes X, Y
Fig. 6
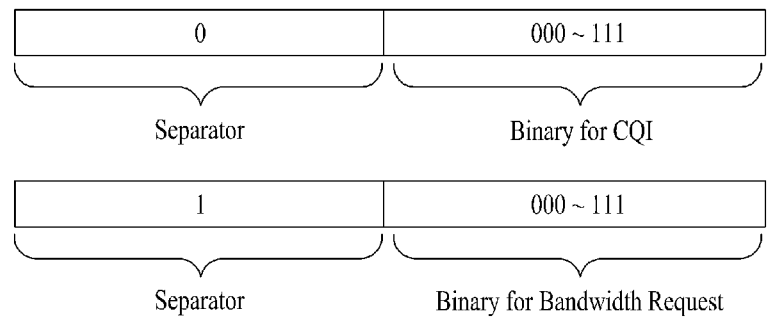
Fig. 7
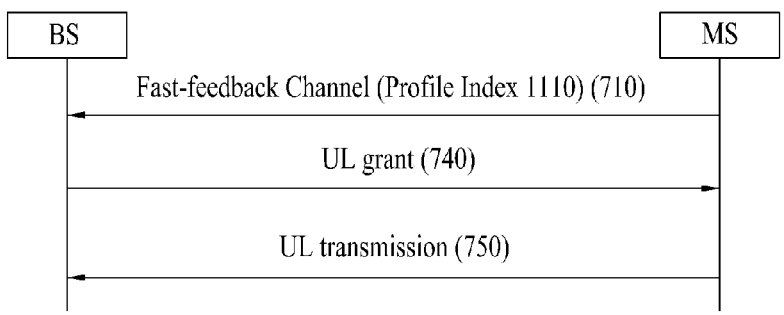

METHOD OF TRANSMITTING AND RECEIVING UPLINK DATA USING TRANSMISSION OF PROFILE INDEXES

CROSS REFERENCE TO RELATED APPLICATIONS

This application is the National Phase of PCT/KR2009/002663 filed on May 20, 2009, which claims priority under 35 U.S.C. 119(e) to U.S. Provisional Application No. 61/056,019 filed on May 26, 2008 and under 35 U.S.C. 119(a) to U.S. patent application Ser. No. 10-2008-0063548 filed in the Republic of Korea on Jul. 1, 2008, all of which are hereby expressly incorporated by reference into the present application.

TECHNICAL FIELD

The present invention relates to uplink allocation in a wideband wireless access system, and more particularly, to a method of allocating an uplink resource to a mobile station and transmitting and receiving data using profile indexes carrying information such as a bandwidth request.

BACKGROUND ART

In a wideband wireless access system, a bandwidth request method is classified into a contention-based request scheme and a contention-free request scheme. In the contention-based request scheme, a plurality of users contends for a bandwidth request in one channel. In the contention-free request scheme, a bandwidth request is transmitted through a channel allocated to each user. When using the contention-free request scheme, a mobile station may transmit a bandwidth request message through a channel allocated by polling of a base station via unicast or may transmit the bandwidth request message by being piggybacked on a remaining region of a previously allocated bandwidth.

FIG. 1 illustrates a procedure for allocating an uplink resource to a mobile station using a contention-based request scheme.

A mobile station (MS) transmits a randomly selected code division multiple access (CDMA) code via a randomly selected slot in a region allocated for a bandwidth request (step 110).

Upon recognizing the CDMA code transmitted from the MS, a base station (BS) allocates, using a CDMA allocation information element (IE), a resource for transmitting a bandwidth request message to the MS (step 120). The MS then transmits the bandwidth request (BW_REQ) message using the corresponding resource region (step 130). The bandwidth request message includes information on a size of a requested bandwidth. If the bandwidth requested by the MS is available, the BS allocates an uplink resource (step 140). The MS transmits data using the allocated uplink resource (step 150).

FIG. 2 illustrates a procedure for allocating an uplink resource to an MS using polling in a contention-free request scheme.

A BS periodically allocates an uplink resource for transmitting a bandwidth request message to the MS (step 210).

The MS transmits, to the BS, the bandwidth request message including information on a bandwidth corresponding to a size of data to be transmitted by the MS (step 230).

If the bandwidth requested by the MS is available, the BS allocates an uplink resource (step 240). The MS transmits data using the allocated uplink region (step 250).

The conventional contention-based request scheme includes a three-step procedure, i.e. a transmission of CDMA code, an allocation of a resource for BW-REQ and a transmission of BW-REQ. The first step may cause a collision and thus this contention-based scheme is not proper to transmit signaling information or traffic which is sensitive to delay. In the polling scheme, as the number of mobile stations receiving polling increase, a resource for transmitting the bandwidth request message (minimum 3 bytes×8=24 bits) and signaling information for indicating the resource increase.

DISCLOSURE OF INVENTION

Technical Problem

An object of the present invention devised to solve the problem lies in providing an uplink data transmitting method using profile indexes, in which a proper bandwidth can be allocated to the MS with respect to a service sensitive to delay and the amount of signaling information necessary for resource allocation can be reduced.

Another object of the present invention devised to solve the problem lies in providing an uplink data receiving method using profile indexes, which can allocate a proper resource by confirming a codeword transmitted from an MS.

Technical Solution

The object of the present invention can be achieved by providing a method of transmitting, at an MS, uplink data, including transmitting any one of codewords mapped to a plurality of bandwidth request profiles according to a service characteristic to a base station through a fast feedback channel, and upon receiving an uplink grant message for an uplink resource allocated in correspondence to the codeword from the base station, transmitting data though the uplink resource.

The codeword may be mapped to at least one profile selected among the bandwidth request profiles according to traffic priority.

The codeword may be mapped to a selected bandwidth request profile based on an average bandwidth of an uplink for services connected to the mobile station.

The codeword may include a separator bit for distinguishing between a bandwidth request and other purposes.

The fast feedback channel is either a channel quality indicator (CQI) channel or an acknowledgement (ACK) channel.

In another aspect of the present invention, provided herein is a method of transmitting, at an MS, uplink data, including notifying a base station of a codeword transmission interval for a bandwidth request through a dynamic service addition request message, transmitting, to a base station, any one of codewords mapped to a plurality of bandwidth request profiles according to a service characteristic every codeword transmission interval through a fast feedback channel, and upon receiving an uplink grant message for an uplink resource allocated in correspondence to the codeword from the base station, transmitting data though the uplink resource.

The dynamic service addition request message may further include any one of an offset and a start frame number of a start position for transmitting the codeword.

The method may further include, if the codeword transmission interval for a bandwidth request is changed, notifying the base station of the changed interval through a dynamic service change request message.

In a further aspect of the present invention, provided herein is a method of receiving, at a BS, uplink data, including receiving any one of codewords mapped to a plurality of bandwidth request profiles according to a service characteristic from a mobile station through a fast feedback channel, allocating an uplink resource corresponding to the codeword, and notifying the mobile station of information as to the allocated resource through an uplink grant message, and receiving data through the uplink resource.

The codeword may be mapped to at least one profile selected among the bandwidth request profiles according to traffic priority.

The codeword may include a separator bit for distinguishing between a bandwidth request and other purposes.

In another aspect of the present invention, provided herein is a method of receiving, at a BS, uplink data, including receiving a codeword reception interval for a bandwidth request from the mobile station through a dynamic service addition request message, receiving any one of codewords mapped to a plurality of bandwidth request profiles according to a service characteristic every codeword reception interval through a fast feedback channel, allocating an uplink resource corresponding to the codeword, and notifying the mobile station of information as to the allocated resource through an uplink grant message, and receiving data though the uplink resource.

Advantageous Effects

According to exemplary embodiments of the present invention, collision does not occur during a resource request, quality of service (QoS) of a real-time traffic sensitive to delay can be satisfied, an uplink allocation request procedure is simplified thus reducing message overhead, and a resource can be efficiently used depending on a characteristic of a service provided to an MS.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates an example of multiplexing a part of all codewords for a bandwidth request with codewords for a CQI;

FIG. 6 illustrates an example of multiplexing a profile index with a CQI using a 4-bit codeword including a separator bit;

FIG. 7 illustrates an exemplary embodiment in which an MS which desires to receive a video telephony service of 5500 bytes performs a bandwidth request using a separator with respect to a BS;

MODE FOR THE INVENTION

Hereinafter, exemplary embodiments of the present invention will be described with reference to the accompanying drawings. However, the present invention is not limited to the exemplary embodiments disclosed below, but can be implemented in various forms.

A mobile station (MS) may perform a bandwidth request using a codeword of a fast feedback channel.

Figure 1:
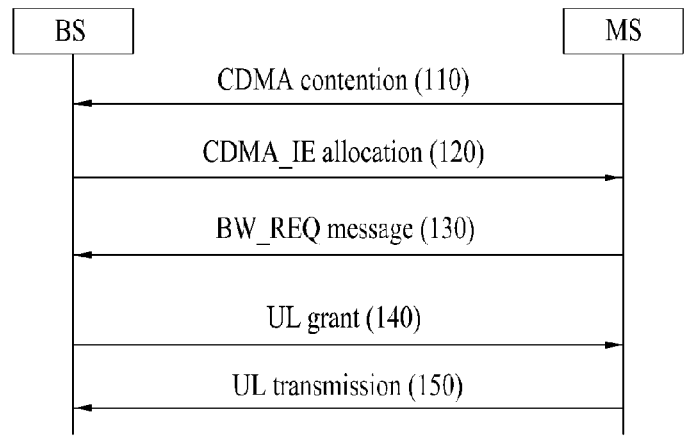
FIG. 1 illustrates a procedure for allocating an uplink resource to an MS using a contention-based request scheme.
Figure 2:
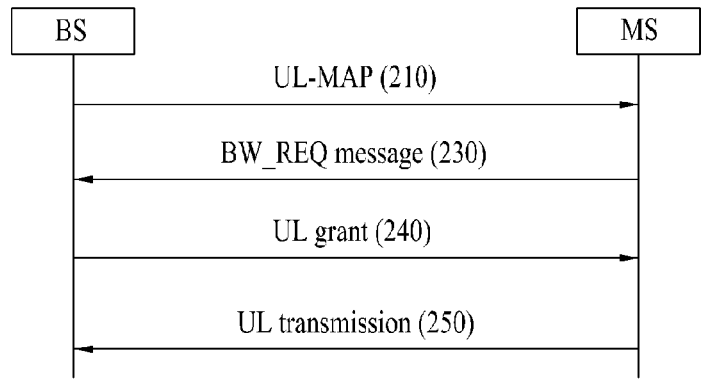
FIG. 2 illustrates a procedure for allocating an uplink resource to an MS using polling in a contention-free request scheme.
Figure 3:
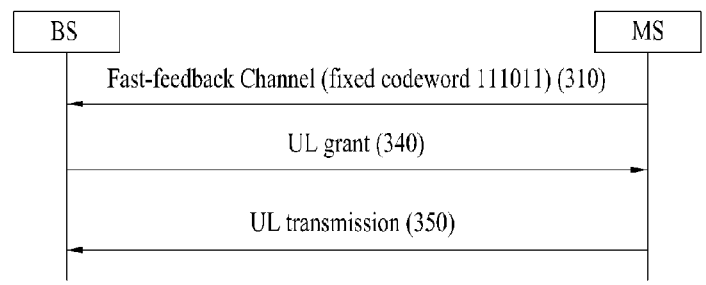
FIG. 3 illustrates a procedure for allocating an uplink resource to an MS using a codeword of a fast feedback channel in a contention-free request scheme.

FIG. 3 illustrates a procedure for allocating an uplink resource for an MS using a codeword of a fast feedback channel in a contention-free request scheme.

A real time polling service (rtPS) refers to an uplink scheduling type in which an MS periodically request data of a variable size, such as moving pictures experts group (MPEG) video, in real time. The MS receiving rtPS may perform an uplink resource allocation request using a predetermined specific codeword (e.g., 111011) of a fast feedback channel.

First, the MS receiving rtPS performs an uplink resource request using a codeword "111011" used for a bandwidth request in a fast feedback channel (step 310).

If a bandwidth of a maximum sustained traffic rate determined in a registration process or a dynamic service connection process is available, a base station (BS) receiving a corresponding request allocates an uplink resource (step 340). The MS transmits corresponding data through an uplink region allocated by the BS (step 350).

However, in such a method using a fixed codeword, the BS recognizes the requested bandwidth as a bandwidth of a maximum sustained traffic rate. Even through an actually required bandwidth is less than or greater than the bandwidth of the maximum sustained traffic rate, since the BS cannot confirm the actually required bandwidth, the BS determines only whether the bandwidth of the maximum sustained traffic rate is available and allocates only a bandwidth corresponding thereto.

Hereinafter, a method is proposed for efficiently performing, at an MS, an uplink resource request in order to uplink transmit signaling or traffic sensitive to delay.

Bandwidth request profiles may be defined using information such as bandwidth, quality of service (QoS) class, traffic type, etc. to be requested by the MS. The profiles may be transmitted to the MS from the BS in the form of system information or may be included within the MS.

Table 1 listed below shows an example of profiles defined in consideration of a bandwidth and a traffic type to be requested.

TABLE 1

| Index | Definition |
|---|---|
| 000 | 1M (bytes) for FTP |
| 001 | 1.5M (bytes) for FTP |
| 010 | 2M (bytes) for FTP |
| ... | ... |
| 101 | 4000 (bytes) for Video Telephony |
| 110 | 6000 (bytes) for Video Telephony |
| 111 | 8000 (bytes) for Video Telephony |

The MS transmits a codeword mapped to an index number of a profile through a fast feedback channel and the BS allocates corresponding bandwidth with reference to the transmitted information. The codeword may be transmitted using the same method as a channel quality indicator (CQI) or acknowledgement (ACK) transmission method. The profiles are not limited to those shown in Table 1 and may be defined in various forms.

Figure 4:
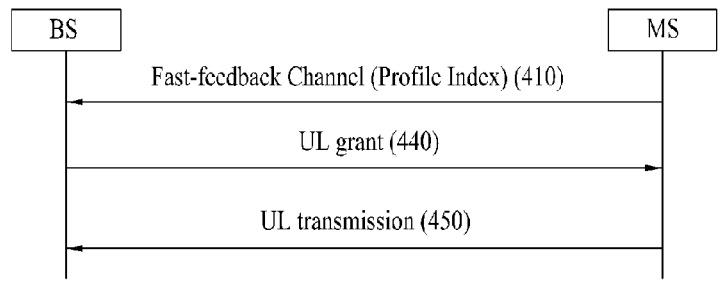
FIG. 4 illustrates a procedure for allocating an uplink resource to an MS according to an exemplary embodiment of the present invention.

FIG. 4 illustrates a procedure for allocating an uplink resource to an MS according to an exemplary embodiment of the present invention.

An MS selects a profile index approximating to a characteristic of a service to be requested and transmits a corresponding codeword through a fast feedback channel (step 410).

A BS confirms a profile corresponding to the codeword, and if a bandwidth of the corresponding profile is available, the BS allocates an uplink resource (step 440).

Thereafter, the MS transmits corresponding data through an uplink region allocated by the BS (step 450).

Meanwhile, for a bandwidth request, a codeword mapped to a profile index may be independently transmitted using a different region or different spread code from a CQI channel or an ACK channel. Further, the codeword mapped to the profile index for a bandwidth request may be transmitted instead of a CQI or ACK using a previously allocated CQI channel or ACK channel.

According to the exemplary embodiment of the present invention, a part of codewords different from CQI or ACK information may be used for profile indexes.

FIG. 5 illustrates an example of multiplexing a part of all codewords for a bandwidth request with codewords for a CQI.

In this case, profile indexes to use limited codewords in a profile list may be determined by the following rule.

First, traffic having the highest priority, that is, traffic sensitive to delay is selected among traffic types connected through a dynamic service addition request/response (DSA-REQ/RSP) or a dynamic service change request/response (DSC-REQ/RSP).

Next, assuming that a profile index having an average bandwidth considering a characteristic of the selected traffic is profile indexmean, profile indexes selected according to a process shown in Table 2 may be mapped to codewords in sequence of the indexes.

TABLE 2 case 0: {profile index$_{mean}$ − 1, profile index$_{mean}$}
case 1: {profile index$_{mean}$, profile index$_{mean}$ + 1}
...
case 11: {profile index$_{mean}$ − 1, profile index$_{mean}$, profile index$_{mean}$ + 1}
case 12: {profile index$_{mean}$ − 2, profile index$_{mean}$, profile index$_{mean}$ + 2}
...

The above process may be repeated until all codewords of a CQI or ACK channel are filled.

The process shown in Table 2 is just one example and various methods for mapping profile indexes may be considered. Such mapping methods may be determined during a cell planning process and may be included in an MS or may be transmitted to the MS from the BS.

According to the exemplary embodiment of the present invention, a separator bit may be used to transmit profile indexes.

FIG. 6 illustrates an example of multiplexing a profile index with a CQI using a 4-bit codeword including a separator bit.

Upon transmitting CQI information through a fast feedback channel, an MS may set a separator to 0 and upon transmitting a profile index, the MS may set the separator to 1. A BS can determine whether received information is information about a profile index by confirming the separator. For example, if a 4-bit codeword is used, the MS may represent 8 profile indexes and 8 CQIs. A profile index request scheme using the separator may be employed irrespective of traffic type.

FIG. 7 illustrates an exemplary embodiment in which an MS which desires to receive a video telephony service of 5500 bytes performs a bandwidth request using a separator with respect to a BS.

In Table 1, profiles of a video telephony service are defined in indexes "101" to "111". Among these, since a profile index corresponding to a minimum size satisfying 5500 bytes is "110", the MS transmits a codeword "1110" (including a separator "1" indicating that a profile index is transmitted and "110" denoting a specific profile) to the BS.

According to the exemplary embodiment of the present invention, profile indexes may be periodically transmitted.

Especially, the MS receiving a service with periodicity such as an rtPS can obtain a resource by periodically transmitting profile indexes.

For example, a CQI is generally transmitted through a resource allocated to transmit the CQI, and a profile index for a bandwidth request may be transmitted at a specific time point known to the BS and the MS. In this case, a periodic profile index bandwidth request scheme may express more profiles than a separator profile index bandwidth request scheme. For example, when a 4-bit codeword is used, the separator profile index bandwidth request scheme can express 8 profile indexes and 8 CQIs, while the periodic profile index bandwidth request scheme can express 16 profile indexes and 16 CQIs.

To perform the periodic profile index bandwidth request scheme, a start time for transmitting a profile index through a fast feedback channel and a transmission period of the profile index are exchanged through a medium access control (MAC) message between the MS and the BS. The MAC message may be exchanged in a process of establishing a service flow. The start time for transmitting the profile index through the fast feedback channel may be expressed as an offset or a start frame number etc.

Hereinafter, the dynamic service addition request/response (DSA-REQ/RSP) and the dynamic service change request/response (DSC-REQ/RSP) are considered as an example of the MAC message exchanged between the MS and the BS.

The following Table 3 shows an example of service flow management encodings to be added to perform a periodic profile index bandwidth request.

TABLE 3

| Name | Length | Value | Scope |
|---|---|---|---|
| BR Interval | 2 | Milliseconds | DSA-REQ, DSA-RSP, DSC-REQ, DSC-RSP |
| BR Offset | 1 | Count | DSA-REQ, DSA-RSP, DSC-REQ, DSC-RSP |
| BR Start Frame Number | 1 | Represents the 8 least significant bits of the absolute frame number | DSA-REQ, DSA-RSP, DSC-REQ, DSC-RSP |

A value of a bandwidth request (BR) interval is determined in consideration of a CQI or ACK transmission interval. For example, a BR interval may be 10 ms or 50 ms.

Figure 8:
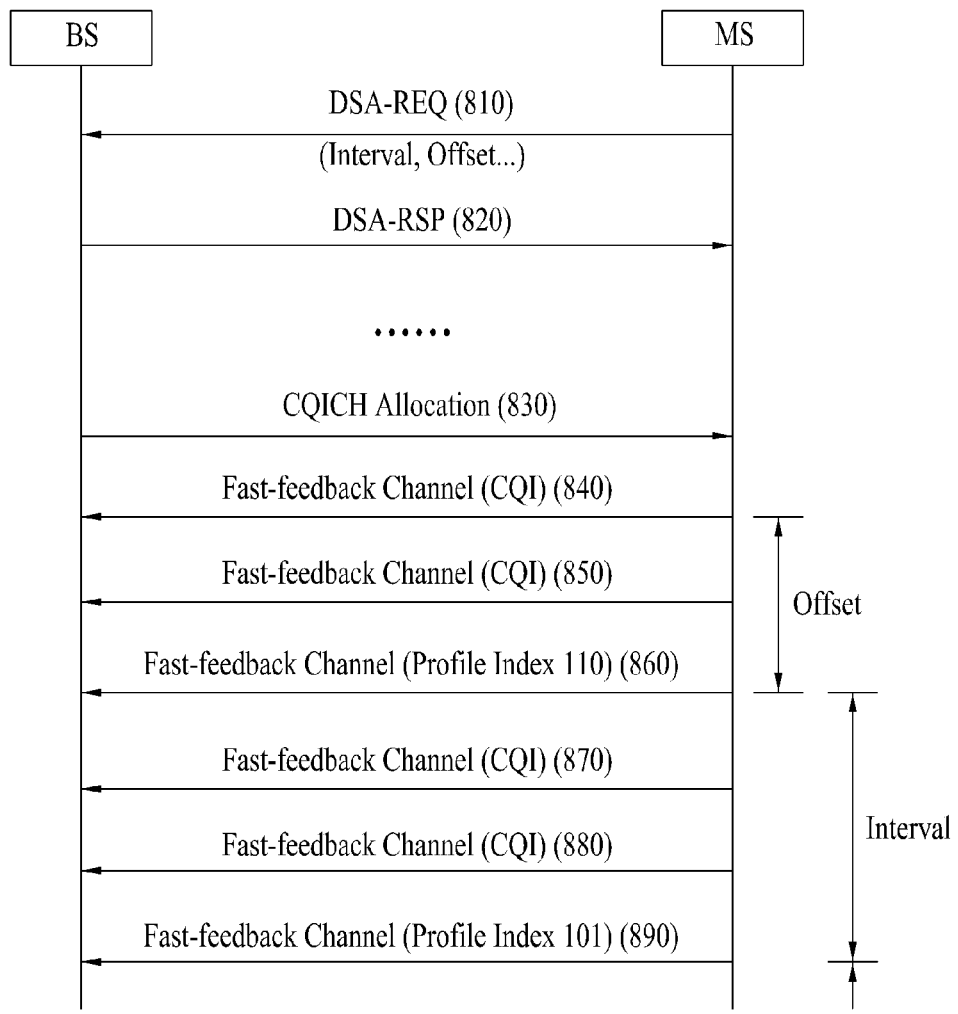
FIG. 8 illustrates an example in which an MS informs a BS of offset information and periodically transmits a profile index according to another exemplary embodiment of the present invention.

FIG. 8 illustrates an example in which an MS informs a BS of offset information and periodically transmits a profile index through a channel quality indicator channel (CQICH) according to another exemplary embodiment of the present invention.

It is assumed that a service provided to the MS has high periodicity such as a video telephony service.

The MS transmits a dynamic service addition request (DSA-REQ) to the BS to generate a new service flow (step 810). The BS then transmits a dynamic service addition response (DSA-RSP) to the MS (step 820). The dynamic service addition request (DSA-REQ) includes an interval, offset, etc. for transmitting a profile index for a bandwidth request by the MS.

The BS allocates a CQICH to the MS (step 830) and the MS transmits CQI information through the allocated CQICH (steps 840 and 850).

Next, the MS transmits a profile index for a bandwidth request to the BS at a time point separated by a bandwidth request offset from a CQICH allocation time point (step 860). In FIG. 8, the transmitted profile index is "110".

The MS transmits the CQI information through the allocated CQICH before the interval of transmitting the profile index has passed (steps 870 and 880).

The MS transmits the profile index for a bandwidth request every profile index transmission interval (step 890). In FIG. 8, the profile index transmitted after the first interval is "101".

Figure 9:
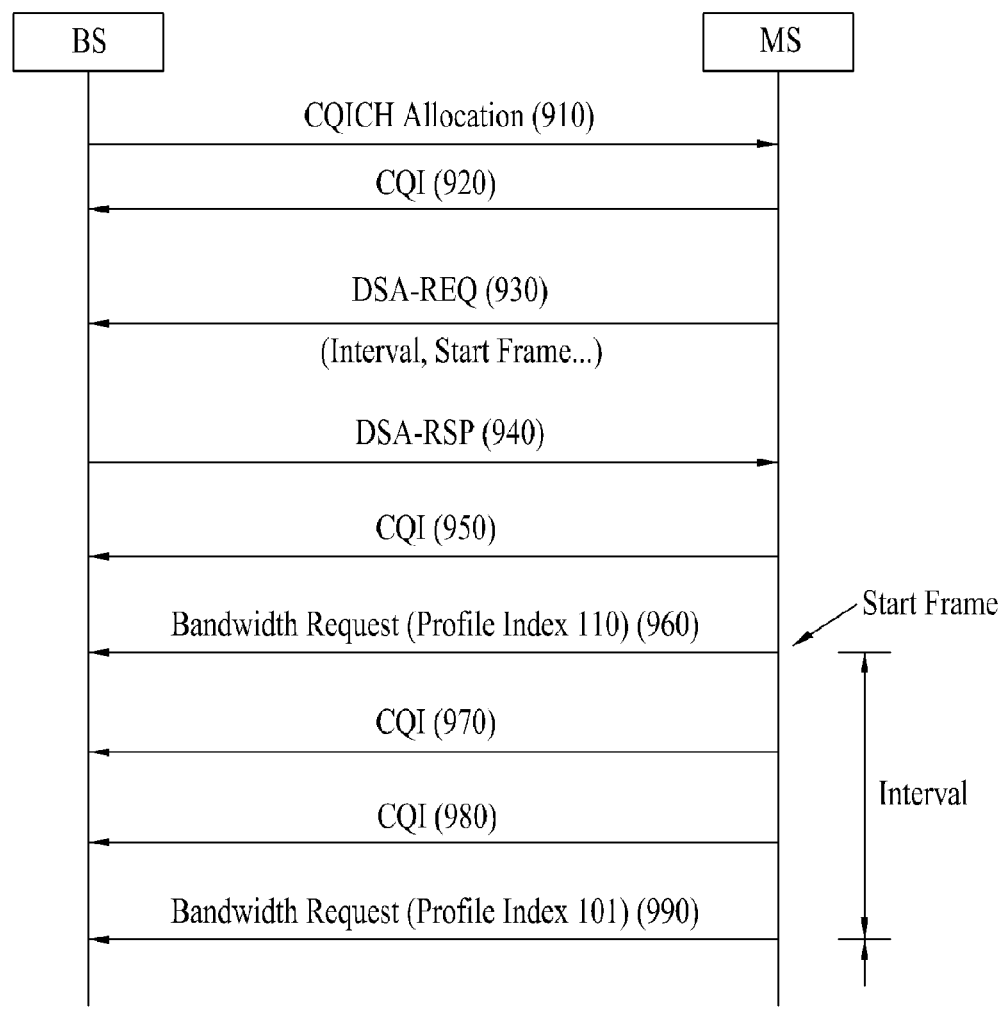
FIG. 9 illustrates an example in which an MS informs a BS of a start frame number and periodically transmits a profile index according to another exemplary embodiment of the present invention.

FIG. 9 illustrates an example in which an MS informs a BS of a start frame number and periodically transmits a profile index through a CQICH according to another exemplary embodiment of the present invention.

The BS allocates a CQICH to the MS (steps 910 and 920) and the MS transmits a dynamic service addition request (DSA-REQ) to the BS to generate a new service flow (step 930). The dynamic service addition request (DSA-REQ) includes an interval or a start frame for transmitting a profile index for a bandwidth request by the MS.

The BS transmits a dynamic service addition response (DSA-RSP) to the MS (step 940).

The MS transmits CQI information through the allocated CQICH (steps 950, 970, and 980).

In such processes, the MS transmits a profile index for a bandwidth request to the BS at a time point corresponding to a bandwidth request start frame number (step 960). In FIG. 9, a transmitted profile index is "110".

The MS transmits a profile index to the BS every profile index transmission interval, which was notified to the BS through the dynamic service addition request (DSA-REQ) (step 990). In FIG. 9, a profile index transmitted after the first interval is "101".

Figure 10:
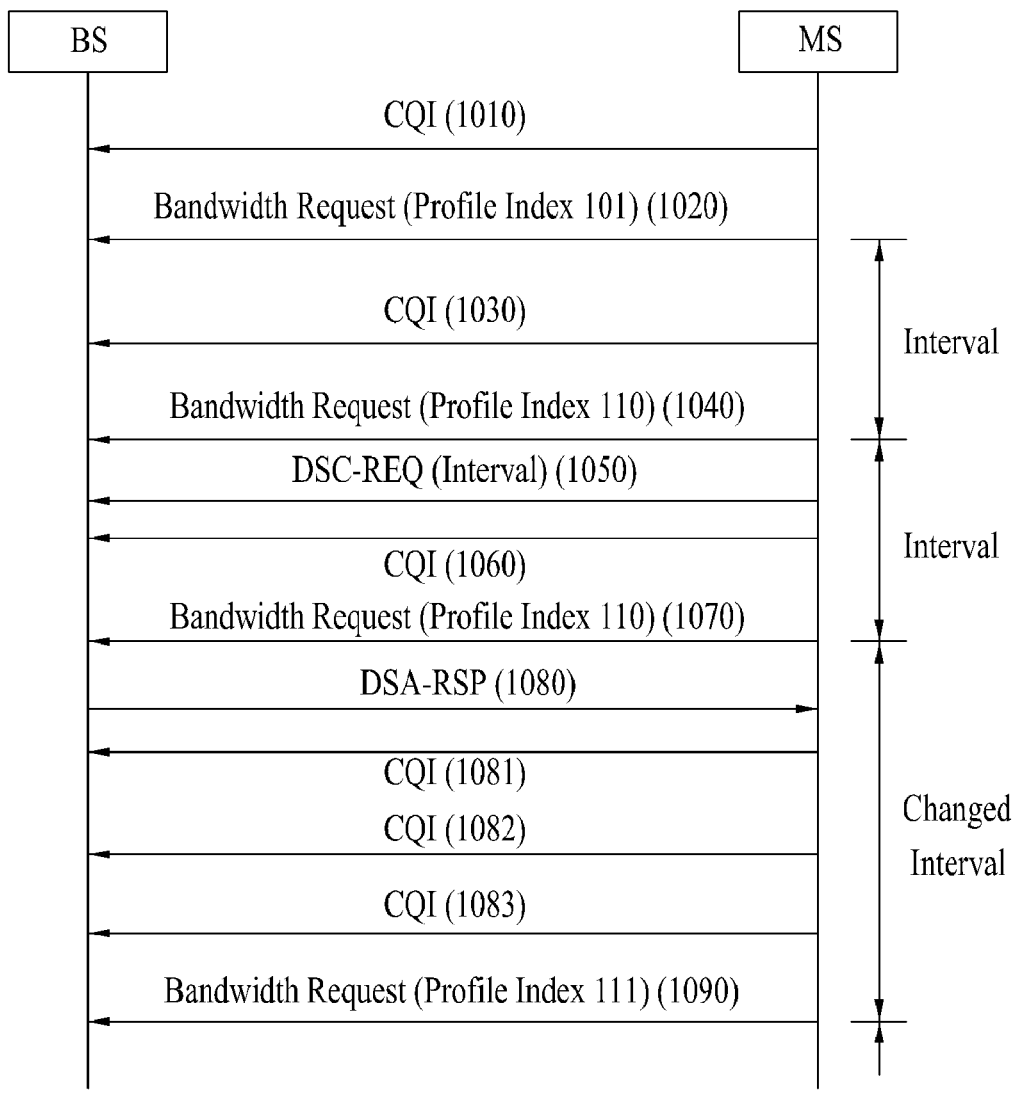
FIG. 10 illustrates an example in which an MS changes a bandwidth request interval in FIG. 9.

FIG. 10 illustrates an example in which an MS changes a bandwidth request interval in FIG. 9.

The MS transmits a CQI (steps 1010, 1030, and 1060) and transmits profile indexes to the BS at regular intervals (steps 1020, 1040, and 1070). In FIG. 10, the profile indexes transmitted at each interval are "101", "110", and "110".

The MS transmits a dynamic service change request (DSC-REQ) to the BS to change a transmission interval of a profile index (step 1050).

If the MS notifies the BS of a changed interval through the dynamic service change request (DSC-REQ), the BS transmits a dynamic service change response (DSC-RSP) to the MS (step 1080).

The MS maintains a previous setting value until the dynamic service change response (DSC-RSP) is received. In this case, a time point for applying the changed interval may be determined using information such as a bandwidth request offset or a bandwidth request start frame number.

After receiving the dynamic service change response (DSC-RSP), the MS transmits profile indexes to the BS every changed interval (step 1090).

In FIG. 10, one profile index is transmitted for one CQI transmission before an interval is changed and one profile index is transmitted for three CQI transmissions (step 1081 to 1083) after the interval is changed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a method of allocating an uplink resource and transmitting and receiving data using profile indexes including information such as a requested bandwidth. The present invention prevents collision during an uplink resource request in an Institute of Electrical and Electronics Engineers (IEEE) 802.16m or World Interoperability for Microwave Access (WiMAX) system, reduces message overhead, and can effectively use resources according to a characteristic of a service provided to an MS. The present invention is applicable to equipment such as a BS, an MS, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of receiving a signal via a channel quality indicator channel (CQICH) by a mobile station, the method comprising:
    configuring periodic transmission times for the CQICH;
    receiving, from the mobile station, information indicating a time set, the time set including a subset of the periodic transmission times; and
    receiving an index among plural indexes via the CQICH,
    wherein, if the index is received at a time within the time set, the index is interpreted as being bandwidth request information, and
    wherein, if the index is received at a time not within the time set, the index is interpreted as being channel quality information.

2. The method of claim 1, wherein the information indicating the time set includes information indicating a transmission time interval and a time offset for transmission of the bandwidth request information.

3. The method of claim 1, wherein, if the index is received at a time within the time set, the plural indexes correspond to plural bandwidth request profiles.

4. The method of claim 3, wherein the plural bandwidth request profiles are defined based on at least one of traffic priorities and bandwidths.

5. A method of transmitting a signal via a channel quality indicator channel (CQICH) by a mobile station, the method comprising:
    configuring periodic transmission times for the CQICH;
    transmitting, to a base station station, information indicating a time set, the time set including a subset of the periodic transmission times; and transmitting an index among plural indexes via the CQICH,
wherein, if the index is transmitted at a time within the time set, the index is interpreted as being bandwidth request information, and
wherein, if the index is transmitted at a time not within the time set, the index is interpreted as being channel quality information.

6. The method of claim 5, wherein the information indicating the time set includes information indicating a transmission time interval and a time offset for transmission of the bandwidth request information.

7. The method of claim 5, wherein, if the index is transmitted at a time within the time set, the plural indexes correspond to plural bandwidth request profiles.

8. The method of claim 7, wherein the plural bandwidth request profiles are defined based on at least one of traffic priorities and bandwidths.

9. A mobile station configured to transmit a signal to a base station station via a channel quality indicator channel (CQICH), wherein periodic transmission times for the CQICH are configured, the mobile station comprising:

a transmitter configured to
transmit information indicating a time set, the time set including a subset of the periodic transmission times, and
transmit an index among plural indexes via the CQICH,
wherein, if the index is transmitted at a time within the time set, the index is interpreted as being bandwidth request information, and
wherein, if the index is transmitted at a time not within the time set, the index is interpreted as being channel quality information.

* * * * *